INVENTOR
JOSEPH DAVEY
By Young & Thompson
ATTYS.

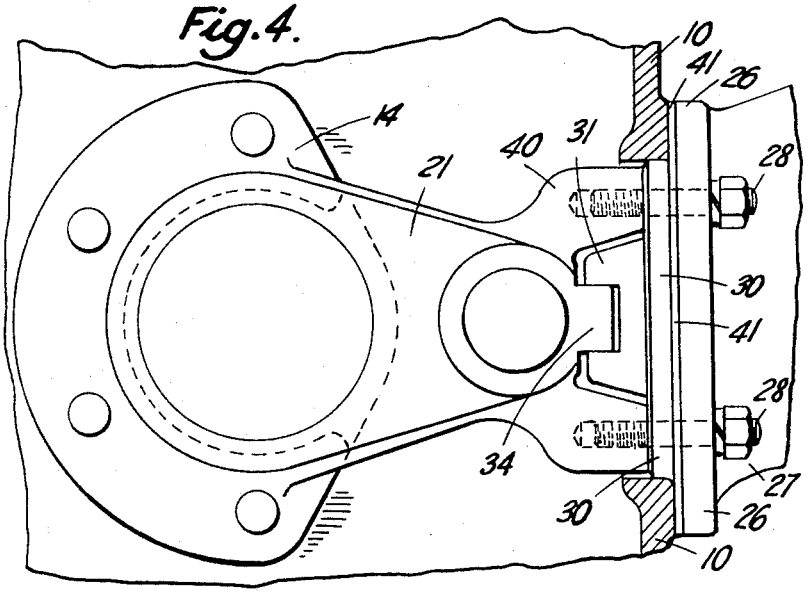
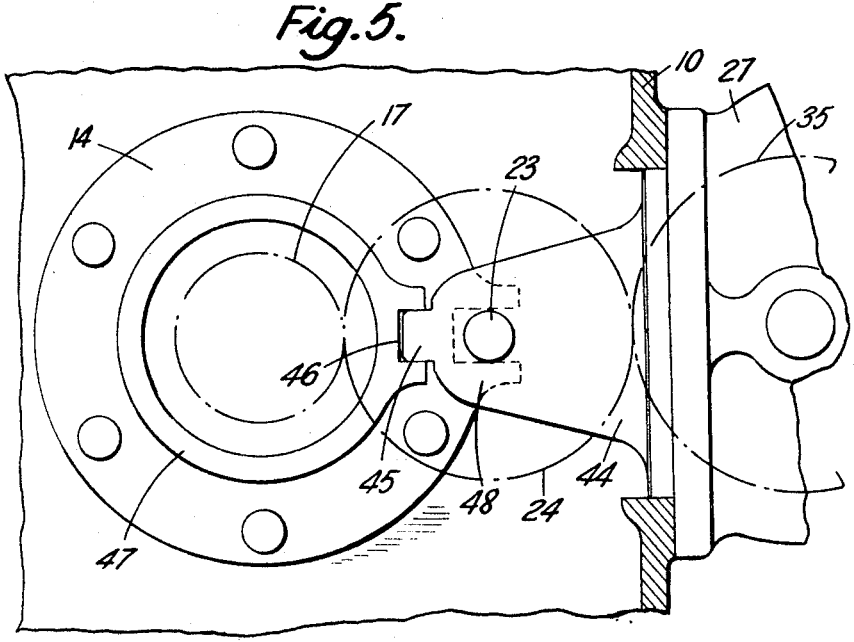

United States Patent Office 3,475,989
Patented Nov. 4, 1969

3,475,989
DRIVING TRANSMISSIONS FOR THE FRONT AND REAR WHEELS OF A VEHICLE
Joseph Davey, Crookham, England, assignor to County Commercial Cars Limited, Aldershot, England, a British company
Filed Mar. 4, 1968, Ser. No. 710,310
Claims priority, application Great Britain, Mar. 10, 1967, 11,344/67
Int. Cl. F16h 57/02
U.S. Cl. 74—606                                        7 Claims

ABSTRACT OF THE DISCLOSURE

A driving transmission for the front and rear wheels of a motor vehicle comprises a fore and aft extending shaft which transmits a drive to the land wheels at one end of the vehicle, which shaft is driven by a train of gear wheels between it and a second fore and aft shaft forming part of a transmission between the vehicle's engine and the land wheels of the other end of the vehicle, the gear wheels being disposed to rotate about parallel fore and aft axes. There are provided two separate supporting structures on each of which certain of the gear wheels are mounted and the supporting structures have abutting faces which when brought together and secured by securing means locate two of the gear wheels in the required meshing relationship. There is provided in addition to the securing means two inter-engaging accurately fitting parts on the two supporting structures, which parts are adapted to locate and maintain in one plane the axes of rotation of the two gear wheels which have been brought into meshing engagement.

---

The invention relates to driving transmissions for the front and rear wheels of a vehicle, particularly for a tractor, and of the kind comprising a fore and aft extending shaft arranged to drive the land wheels at one end of the vehicle, which shaft is driven by a train of gear wheels between it and a second fore and aft shaft associated with a transmission between the vehicle's engine and the land wheels at the other end of the vehicle, which gear wheels rotate about parallel fore and aft axes and are mounted on two separate supporting structures having abutting faces which, when brought together and secured by securing means, hold two of the gear wheels in the required meshing relationship.

Such a driving transmission is particularly applicable where it is required to convert a two-wheel drive vehicle to four-wheel drive. In this case the transmission may be in the form of a set of parts which may be applied to a two-wheel drive tractor to effect such a conversion.

It is essential to maintain correct alignment between all the gears of the gear train so that their axes of rotation are at all times parallel to one another. Whilst this is a comparatively simple matter of machining accuracy in the case of gear wheels which are mounted on the same supporting structure, it is more difficult to achieve the necessary alignment between the two gears which are brought into mesh when the abutting faces of the supporting structures are brought together and secured together. It is an object of the invention to ensure that when the abutting faces of the supporting structures are brought together and secured together the axes of rotation of the gear wheels which have been brought into meshing relationship, lie in one plane.

According to the invention a driving transmission of the kind referred to is characterised in that the supporting structures are provided, in addition to said securing means, with inter-engaging accurately fitting parts adapted to locate and maintain in one plane the axes of rotation of said two gear wheels which have been brought into meshing engagement.

The inter-engaging parts are preferably so shaped as to prevent relative rotation between the supporting structures about an axis at right angles to the abutting faces thereof.

In one form of construction the inter-engaging parts may comprise a dog and slot which are interengageable with one another when the abutting faces of the supporting structures are brought together to effect intermeshing of said two gear wheels. The dog may have opposed faces which are engageable with opposed faces of the slot, which faces are flat and are disposed at right angles to the abutting faces of the supporting structures, and parallel with the axes of rotation of said meshing gear wheels.

The supporting structures may comprise two casings each housing a part of the train of gear wheels, and the aforesaid inter-engaging parts are carried on the two casings respectively and engage at a location within one of the casings.

In the case where the inter-engaging parts comprise a dog engageable by a slotted part, the slotted part may be formed on or attached to the casing which accommodates the first said fore and aft extending shaft, and the dog may be formed on or attached to the casing through which extends said shaft associated with the transmission between the vehicle's engine and the land wheels at said other end of the vehicle.

Alternatively the slotted part may be formed on or attached to the casing through which extends the shaft associated with the transmission between the vehicle's engine and the land wheels at said other end of the vehicle, and the dog may be formed on or attached to the casing which accommodates the first fore and aft extending shaft.

The following is a more detailed description of a number of embodiments of the invention reference being made to the accompanying drawings in which:

FIGURE 4 is a similar view to the left-hand end of FIGURE 1 showing an alternative form of construction; and FIGURE 5 is a similar view to FIGURE 4 showing a further alternative construction.

Figure 2:
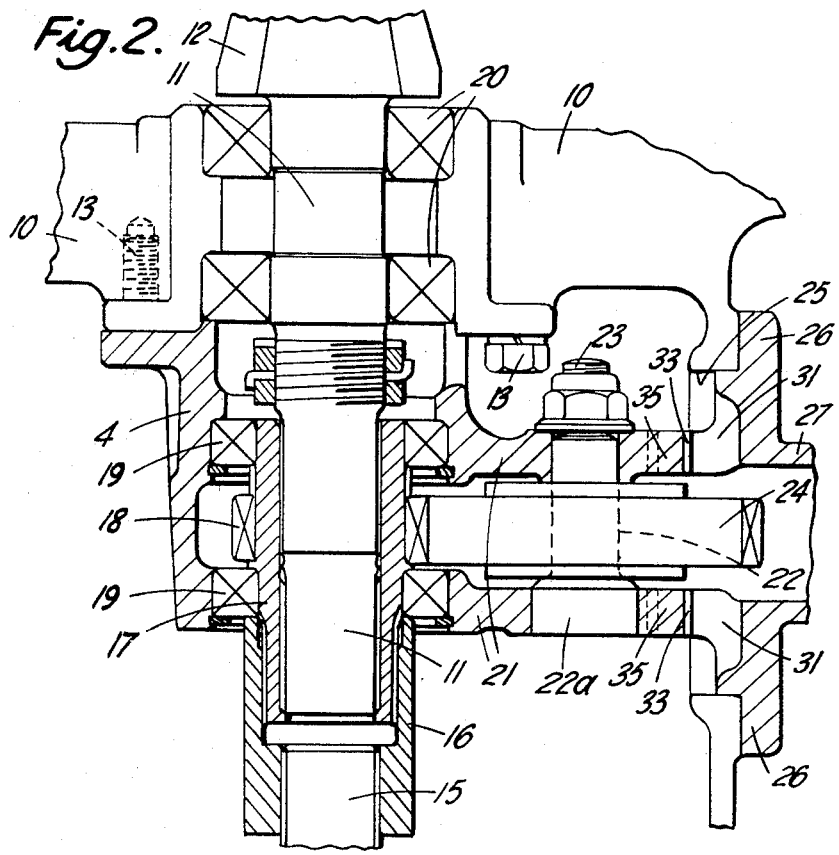
FIGURE 2 is a horizontal section through part of the driving transmission shown in FIGURE 1.

The main body part 10 of the tractor comprises one of the casings for part of the gear train previously referred to and supports a shaft 11 in bearings 20 (see FIGURE 2). The shaft 11 is provided with a bevel pinion 12 which drives the bevel wheel of the conventional rear axle differential of the tractor (not shown).

Figure 3:
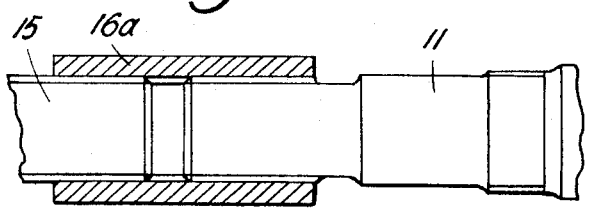
FIGURE 3 is a horizontal section through part of a conventional connection between the output shaft of a tractor gear box and the shaft driving the rear wheels of the tractor.

The end of the shaft 11 is splined and, in a conventional two-wheel drive arrangement as shown in FIGURE 3, the splined end of the shaft is connected to a splined end of the output shaft 15 of the tractor gear box by an internally splined sleeve 16a.

This conventional arrangement, in which only the two rear wheels of the tractor are driven, is converted to a four-wheel drive arrangement by coupling the shaft 11, through a gear train, to another fore and aft extending shaft 38 which drives a differential gear associated with the steerable front wheels of the tractor.

Figure 1:
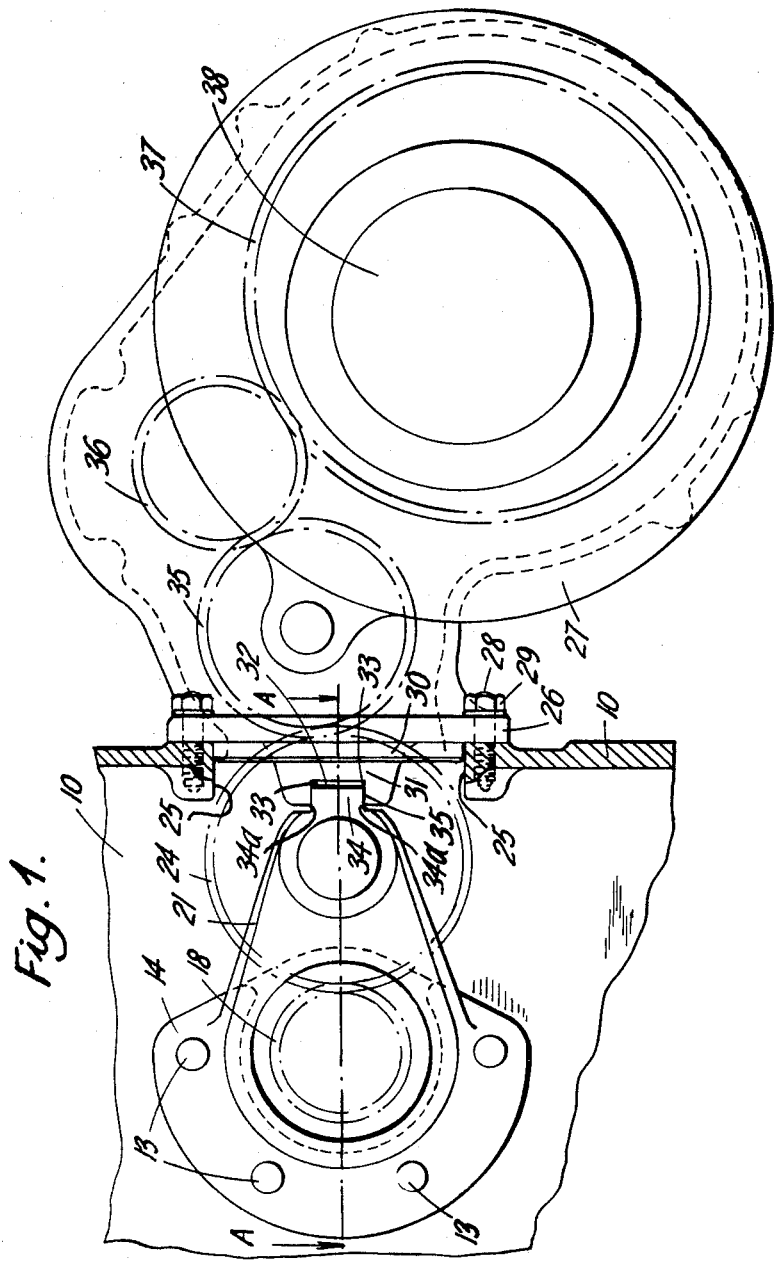
FIGURE 1 is a part section and part elevation of a driving transmission for a tractor, looking from the front of the tractor, and showing two casing parts which house a train of gears between a fore and aft shaft driving the steerable wheels of the tractor, and a second fore and aft shaft associated with the vehicle transmission and for driving the rear wheels of the tractor.

In the converted arrangement shown in FIGURES 1 and 2, a supporting structure 14 is secured to the inside of the casing 10 by screws 13. The splined end of the output shaft 15 of the tractor gear box is engaged by an internally splined sleeve 16 which engages external splines on a tubular shaft 17 formed with a gear wheel 18. The tubular shaft 17 is provided with internal splines which engages splines at the end of the aforesaid shaft 11. The tubular shaft 17 is supported by bearings 19 in the supporting structure 14.

The supporting structure 14 is formed with a forked extension 21 through the arms of which extends a spindle 22 having a head 22a at one end and a threaded portion at the other end which is engaged by a clamping nut 23. A gear wheel 24 is rotatably mounted on the spindle between the arms of the forked extension 21. The gear wheel 24 meshes with the gear wheel 18 on the tubular shaft 17.

The casing 10 is provided with an opening 25 through which a part of the gear wheel 24 projects. Secured to the casing around the opening is a flange 26 of another casing 27, the flange being provided with holes through which extend studs 28 (see FIGURE 1) projecting from threaded holes in the casing 10 and which studs are engaged by clamping nuts 29. The flange 26 is provided with a spigot portion 30 which registers with the opening 25.

As shown in FIGURE 1 there is mounted in the casing 27 a fore and aft extending shaft 38 which drives a differential gear associated with the steerable front wheels of the tractor. A gear wheel 37 is carried on the shaft 38 and meshes with a gear wheel 36 which in turn meshes with a gear wheel 35, the gear wheels 35 and 36 being rotatably mounted in the casing 27.

The gear wheel 35 is brought into mesh with the gear wheel 24 by bringing the flange 26 on the casing 27 into abutting relation with the casing part 10 and clamping the two parts together by means of the studs 28 and clamping nuts 29.

As best seen from FIGURE 2, two spaced lugs 31 project from the flange 26 and spigot 30 into the casing 10 and, as seen in FIGURE 1, are formed with slots 32 having flat opposed faces 33 which extend at right angles to the abutting faces between the flange 26 and the casing 10 and are also parallel with the axes of rotation of the gear wheels 18 and 24. These flat faces 33 straddle and accurately fit opposed faces 34a on dogs 34 formed on the extremities of the arms of the forked extension 21.

Thus although there may be an imprecise fit between the studs 28 and the holes in the flange 26, once the flange 26 has been brought into abutting engagement with the face of the casing 10, the slots 32 on the lugs 31 inter-engage with the dogs 34 and ensure that the axis of rotation of the gear wheel 35 is brought into accurate parallel relationship with the axis of rotation of the gear wheel 24 so that the required meshing relationship between the gear wheels 24 and 35 is established.

A secondary function of the inter-engaging dogs 34 and slots 32 is to transmit the torque reaction of the gear wheel 24 on the housing 10 thus relieving the screws 13 of load.

In the alternative arrangement shown in FIGURE 4, instead of the flange 26 being directly clamped to a face of the casing 10 it is clamped to an enlargement 40 at the end of the support 14, which enlargement is provided with tapped holes which are engaged by studs 28 passing through holes in the flange 26 and spigot 30, the studs 28 receiving clamping nuts by which the flange is drawn towards the casing 10. A resilient gasket 41 is disposed between the flange 26 and the face of the casing 10. By these means variations in tolerance are allowed between the casing 27 and the suppotring structure 14 on the one hand and the casing 10 on the other hand.

In the alternative arrangement shown in FIGURE 5, instead of the casing parts 27 being provided with a short forked lug 31 is is provided with a single and longer lug 44 which extends across one side of the gear wheel 24 and is provided with a single dog 45 which engages between the sides of a slot 46 formed on a part 47 of the supporting structure 14. Another part of the supporting structure 14 is provided with a slotted extension 48 which extends across opposite faces of the gear wheel 24 and engages the end of the spindle 22 on which the gear wheel rotates.

I claim:

1. A driving transmission, for the front and rear wheels of a vehicle, comprising:
   (a) a fore and aft extending shaft adapted for driving connection to the land wheels at one end of the vehicle,
   (b) a second fore and aft shaft adapted for driving connection between the vehicle's engine and the land wheels at the other end of the vehicle,
   (c) a train of gear wheels between the two fore and aft shafts, which gear wheels rotate about parallel fore and aft axes,
   (d) two separate supporting structures on each of which certain of the gear wheels are mounted,
   (e) abutting faces on the supporting structures, which faces, when brought together locate two of the gear wheels in the required meshing relationship,
   (f) securing means adapted to hold the abutting faces of the supporting structures in abutting relationship,
   (g) inter-engaging accurately fitting parts adapted to locate and maintain in one plane the axes of rotation of said two gear wheels which have been brought into meshing engagement.

2. A driving transmission according to cliam 1 wherein the inter-engaging parts are so shaped as to prevent relative rotation between the supporting structures about an axis at right angles to the abutting faces thereof.

3. A driving transmission according to claim 2 wherein the inter-engaging parts comprise a dog and slot which are interengageable with one another when the abutting faces of the supporting structures are brought together to effect intermeshing of said two gear wheels.

4. A driving transmission according to claim 3 wherein the dog has opposed faces which are engageable with opposed faces of the slot, which faces are flat and are disposed at right angles to the abutting faces of the supporting structures, and parallel with the axes of rotation of said meshing gear wheels.

5. A driving transmission according to claim 1 wherein the supporting structures comprise two casings each housing a part of the train of gear wheels, and wherein the aforesaid inter-engaging parts are carried on the two casings respectively and engage at a location within one of the casings.

6. A driving transmission according to claim 5 wherein the inter-engaging parts comprise a dog engageable by a slotted part, and the slotted part is provided on the casing which accommodates the first said fore and aft extending shaft, and the dog is provided on the casing through which extends said shaft associated with the transmission between the vehicle's engine and the land wheels at said other end of the vehicle.

7. A driving transmission according to claim 5 wherein the inter-engaging parts comprise a dog engageable by a slotted part, and the slotted part is provided on the casing through which extends the shaft associated with the transmission between the vehicle's engine and the land wheels at said other end of the vehicle, and the dog is provided on the casing which accommodates the first fore and aft extending shaft.

References Cited

UNITED STATES PATENTS

| | | | |
|---|---|---|---|
| 2,574,986 | 11/1951 | Schou | 74—606 X |
| 2,623,604 | 12/1952 | Keese | 74—606 X |
| 2,671,360 | 3/1954 | Bade | 74—421 X |
| 3,162,061 | 12/1964 | Belezos | 74—606 |

LEONARD H. GERIN, Primary Examiner